United States Patent [19]

Litt et al.

[11] 4,028,132

[45] June 7, 1977

[54] CELLULOSE SOLUTIONS AND PRODUCTS PREPARED THEREFROM

[75] Inventors: Morton H. Litt, University Heights, Ohio; Narayan Ganesh Kumar, Webster, N.Y.

[73] Assignee: International Playtex, Inc., New York, N.Y.

[22] Filed: Nov. 25, 1975

[21] Appl. No.: 635,017

[52] U.S. Cl. .............................. 106/163 R; 536/56
[51] Int. Cl.² .......................................... C08L 1/02
[58] Field of Search ........... 106/163, 122; 260/212; 264/187, 207; 8/125; 536/56

[56] References Cited

UNITED STATES PATENTS

| | | | |
|---|---|---|---|
| 2,011,160 | 8/1935 | Plepp et al. | 106/122 |
| 2,635,286 | 4/1953 | Rivoche | 264/187 |
| 3,492,177 | 1/1970 | Rau | 149/22 |

FOREIGN PATENTS OR APPLICATIONS 209,325   1/1968   U.S.S.R.

OTHER PUBLICATIONS

The Chemisty of Cellulose, E. Heuser, pp. 136, 137.
Chem. Abst. 48:7893i, 1954.
Chem. Abst. 66:77931z, 1967.
Chem. Abst., 67:33998t, 1967.

*Primary Examiner*—Theodore Morris
*Attorney, Agent, or Firm*—Stewart J. Fried; Jeffrey A. Schwab; Morris N. Reinisch

[57] ABSTRACT

Solutions of cellulose in hydrazine are formed by dissolving cellulose therein. The cellulose solutions formed may be utilized for the preparation of fibers, films, foams or other cellulose fabricated articles. Alternatively, the dissolution of cellulose in hydrazine may be employed as a means for the direct extraction of cellulose from lignocellulosic materials without the necessity of pulping operations.

18 Claims, No Drawings

CELLULOSE SOLUTIONS AND PRODUCTS PREPARED THEREFROM

BACKGROUND OF THE INVENTION

This invention relates to cellulose solutions, and to the preparation of cellulose fibers, films, foams and fabricated articles therefrom, and to the direct extraction of cellulose from lignocellulosic materials.

The dissolution of cellulose has been a primary objective of workers in the art since the very dawn of cellulose chemistry. Cellulose solutions form the basis for the commercial manufacture of cellulose fibers, films, foams, and other cellulose molded, shaped or otherwise manufactured articles or products (referred to herein as "fabricated articles").

Because of its great crystallinity, relatively rigid backbone and high melting point (decomposition temperature) cellulose is more difficult to dissolve than related polysaccharides, e.g., starch and dextran. The known solvents for cellulose effect dissolution by first forming a cellulose salt or complex, e.g., a cellulose nitrate, acetate, xanthate, ether or metallo complex. Cellulose solvents include various concentrated mineral acids, some salt solutions at high concentrations and elevated temperatures, various organic amines and ammonium and diamine complexes of heavy metals such as iron, cobalt, nickel, copper, cadmium or zinc, e.g., cuoxam [tetramminocopper dihydroxide [$Cu(NH_3)_4$]($OH_2$)], or cuene [bis(ethylenediamine) copper dihydroxide [$NH_2CH_2CH_2NH_2$]$_2Cu(OH)_2$], dibenzyldimethylammonium hydroxide, nitrogen tetroxide in acetonitrile or dimethylformamide, or the like. [See Encyclopedia of Polymer Science & Technology, Kirk-Othmer, 3 (1965), page 166; Encyclopedia of Chemical Technology, Kirk-Othmer, 2nd Ed., 4, (1965), page 601; Polymer Handbook, Brandrup & Immergut, Chapter VI, "Properties of Celluluse Materials", pages 14–16.]; and U.S. Pat. Nos. 1,943,176 and 3,305,499.

The use of conventional techniques such as the viscose and acetate processes for the manufacture of cellulose and cellulose derivative fibers and other products currently faces critical problems due to ever-increasing capital investment, energy and pollution control costs.

The use of various solvent-based processes for dissolving cellulose and manufacturing fibers, films, foams or other fabricated articles therefrom is subject to the further disadvantage that solution is effected in these procedures by reaction to form a more soluble cellulose salt or complex - materials thus dissolved are mixed products from which pure cellulose must be recovered by expensive purification and recovery operations, or which solutions exhibit decrease thermal stability or increased corrosive characteristics, thus frequently precluding their use for the preparation of cellulose fibers or foams or in similar applications.

For example, U.S. Pat. No. 3,424,702 discloses dissovling cellulose in mixtures of liquid sulfur dioxide with aliphatic secondary or tertiary, or alicyclic, amines. It is believed that these mixtures effect dissolution by forming sulfite half esters with the —OH groups of the cellulose, the amine then forming a salt or strongly hydrogen bonding with the sulfite. Esterification breaks up the crystallinity of the cellulose molecule and permits dissolution.

The compound thus formed is, however, unstable, breaking down (with degradation) slowing at room temperatures and more rapidly at elevated temperatures. Because of this thermal instability cellulose fibers cannot be readily prepared from such solutions.

Accordingly, it is among the objects of the present invention to provide cellulose solutions which may be used in the manufacture of cellulose fibers, films, foams and other fabricated articles without the magnified capital investment, energy and pollution control problems to which existing processes are increasingly subject. A further object of the invention is to provide cellulose solutions without the use of reactive solvents, which solutions may be directly utilized employing known techniques in the production of cellulose products. Other objects and advantages of the invention will become apparent from the following description of preferred embodiments thereof.

SUMMARY OF THE INVENTION

In accordance with the present invention it has been found that cellulose can be dissolved in hydrazine without chemical reaction therewith, the resulting solutions being stable or metastable even under standard temperature and pressure conditions, and thereby permitting subsequent processing and direct conversion by conventional techniques to form cellulose fibers, films, foams or other fabricated articles. The cellulose solutions hereof may thus be directly transformed by wet- or dry-spinning into fibers, or be cast into films, without the separation and removal of reaction impurities.

In accordance with a further feature of the present invention, it has been found that the differential solubility of cellulose in hydrazine vis-a-vis other wall constituents such as lignin, hemicelluloses and pectin (referred to herein as "lignocellulosic materials") may be utilized for the separation of cellulose therefrom. It is thus possible to separate cellulose from raw wood, unbleached fibers or other lignocellulosic materials without the use of conventional kraft, sulfite or other pulping operations.

Hydrazine is not known to be a solvent for cellulose. It is known that hydrazine effects swelling of cellulose [see, for example, Chem. Abstracts, 48, 7893i (1954) and Chem. Abstracts, 58, 8626d (1964)] or, under certain conditions, forms additional compounds therewith [see, for example, Chem. Abstracts, 32, 1089 10 (1938); Chem. Abstracts, 33, 4020 l (1939); Chem. Abstracts, 34, 2587 2 (1940); and Chem. Abstracts, 43, 8131i (1949)]. It was not, however, known prior hereto that, cellulose may be dissolved in hydrazine, permitting subsequent processing to form cellulose fibers, films, foams or fabricated articles therefrom.

It has now been found that at elevated temperatures cellulose dissolves in pure hydrazine or even in hydrazine diluted with a miscible diluent or co-solvent. Cellulose-in-hydrazine solutions are thus formed at temperatures as low as about 100° C or as high as about 250° C. When temperatures in excess of the boiling point of hydrazine (113° C) are utilized, the system is pressurized to maintain the constituents in the liquid phase. Preferably, dissolution is effected at temperatures of from about 150° to 210° C, most desirably between 160° and 200° C., use of the higher temperatures improving dissolution. Care must, however, be taken to avoid excessive temperatures at which charring of the cellulose may occur.

Commercially available anhydrous hydrazine normally contains water as a diluent in an amount of at least about 3%, and frequently 4%, by weight thereof. Cellulose is soluble in hydrazine of that purity, and in fact in hydrazine containing up to about 30 weight % water, under the elevated temperature conditions of this invention. Hydrazine can also be mixed with other diluents, the latter generally in minor proportions, and still dissolve cellulose upon heating the mixture. The degree to which the hydrazine can be diluted without precluding the solubility of cellulose therein varies, depending upon the composition of the diluent, the temperature of dissolution, the degree of polymerization (D.P.) of the cellulose to be dissolved, the cellulose concentration, and other parameters of the system. Generally, it is preferred that at least 50% by weight, and preferably 70%, of the solvent medium comprises hydrazine. Those materials which swell cellulose themselves, e.g., dimethyl sulfoxide, can be admixed with the hydrazine in even greater proportions (e.g., up to about 70% by weight of the mixture thereof).

Cellulose of any desired degree of polymerization can be dissolved in hydrazine with heating in accordance herewith. Thus, celluloses having D.P. values as low as about 50 or as high as about 2500 so dissolve, the dissolution of celluloses of from about 100 to 2500 being preferred, and from about 200 to 2100 particularly desired, for fiberforming or like purposes.

Under the indicated conditions celluloses within the range of degree of polymerization specified can be dissolved in hydrazine in concentrations ranging up to about 30% or more by weight. Solutions of cellulose in concentrations in excess of about 5%, and preferably from about 10–20%, are particularly useful for film and fiber applications, whereas solutions having cellulose concentrations as low as about 1% are useful for other purposes.

The solutions thus formed can be either thermodynamically stable true solutions of cellulose, or metastable solutions, depending upon the above parameters, viz., the temperature, hydrazine purity (degree of dilution), the D.P. value of the cellulose dissolved and its concentration in the particular solution. Either form of solution may be used in conventional processing to produce cellulose fibers, films, foams or fabricated articles therefrom.

While not intending to be bound by any theory, it is believed that hydrazine dissolves cellulose under those conditions at which its cohesive energy density approximates the cohesive energy density of cellulose. In this regard hydrazine appears to be unique in that a number of other solvents, e.g., 1,1-dimethylhydrazine, dimethylsulfoxide/water, water and water/methanol mixtures (see Control Experiments C and J–N below, respectively) have been found ineffective to dissolve cellulose under conditions at which their cohesive energy densities have been calculated to similarly approximate that of cellulose. Whatever, the physical mechanism by which the solutions may be formed, however, it is intended that the cellulose solutions and products prepared therefrom in accordance with the present invention are limited only as defined in the claims annexed hereto.

The cellulose in hydrazine solutions hereof may be dry-spun into fibers by extruding a stream of such a solution through an extrusion zone and into contact with a heated evaporative medium to evaporate the solvent therefrom. Alternatively, the solutions may be subjected to conventional wet-spinning wherein a viscous dope thereof is injected into a non-solvent, coagulated and stretched into fibers. In certain cases, the solutions hereof may also be subjected to flash-spinning by extrusion under elevated temperature and pressure through an apertured spinnerette into air at normal pressure as described, for example, in U.S. Pat. No. 3,542,715. Cellulose fibers may thus be formed from the solutions hereof employing known fiber-forming techniques.

Cellulose films may be prepared from the solutions hereof by casting drops thereof and evaporating the solvent or extruding into a coagulating bath, either with or without subsequent uniaxial or biaxial orientation of the film.

Cellulose foams may be produced from the concentrated solutions by casting blocks and leaching out the solvent with water, for example; or by incorporating therein hydrazine-insoluble materials, casting blocks therefrom, coagulating the same or allowing it to crystallize, and leaching out the insoluble materials. Alternately, foams may be produced by flashing at least a portion of the hydrazine solvent to effect boiling and consequent foaming thereof. Blowing agents, low boiling co-solvents, or other conventional additives may be added to the solution as recognized in the art.

Further, other fabricated cellulose articles may be prepared from the solutions of the invention by casting, molding or extruding the desired fabricated articles therefrom. In this manner, structural members of any predetermined configurations may be directly produced from the cellulose-in-hydrazine solutions.

The dissolution of cellulose in hydrazine may, as indicated hereinabove, also be utilized for the separation of cellulose from admixture with lignocellulosic materials or for direct utilization of the whole materials without separation. Separation may be effected, for example, by dispersing wood chips, shavings or the like in hydrazine, and utilizing the differential solubility of the cellulose and the lignocellulosic materials in the hydrazine to separate the same. The cellulose may thereafter be subjected to any desired technique for production of fibers or films or other desired end products.

PREFERRED EMBODIMENTS OF THE INVENTION

Preferred embodiments for preparing cellulose solutions, for producing cellulose fibers, films and foams therefrom, and for extracting cellulose from lignocellulosic materials with hydrazine, are illustrated hereinafter. In the following discussion and the several illustrative examples all parts and percentages are given by weight, unless otherwise specified. All temperatures are given in degrees Celsius and all pressures in pounds per square inch gauge.

As indicated hereinabove, the conditions utilized to effect solution of the cellulose can vary, depending upon a number of interrelated parameters, including the degree of polymerization of the cellulose to be dissolved, the concentration of the cellulose in the hydrazine solvent, the amount of water or other diluent present or admixed with the solvent, and the temperature at which dissolution is effected. For example, utilizing a cellulose with a D.P. of about 550 and a substantially anhydrous hydrazine solvent, cellulose may be dissolved in concentrations of 30%, at temperatures of about 200° C. As another example, utilizing celluloses of 2100 D.P., solutions of about 10% concentration can be prepared under substantially the same conditions. The specific conditions required to dissolve specific amounts of cellulose in the hydrazine solvent can vary widely, dependent upon the parameters of the particular system employed.

In experiments conducted in accordance herewith "anhydrous" hydrazine containing 4% water dissolved a D.P. 2100 cellulose. On the other hand, hydrazine hydrate (containing about 35% by weight water) did not dissolve the relatively high molecular weight cellulose (see Control A below). Lower molecular weight celluloses may, however, be dissolved in hydrazine containing proportions of water up to about 30% by weight of the hydrazine/water solution.

As noted herein, other diluents, stabilizing agents or other additives can be incorporated in the hydrazine solvent system, without precluding solution. The addition of such additives can be useful in commercial operations to minimize costs and the risks attendant use of the volatile and potentially explosive hydrazine solvent.

Examples of suitable stabilizing agents for hydrazine are sulfamido acetate salts such as described in U.S. Pat. No. 2,680,066; and aluminum, zinc and cadmium oxides as disclosed in U.S. Pat. No. 2,837,410. Other known stabilizing agents can also be utilized in the solutions formed in accordance with this invention.

Examples of suitable diluents which can be incorporated in the cellulose solutions hereof comprise inert polar solvents such as N-methyl pyrrolidone, dimethyl acetamide, ammonia, methylamine, ethylamine, ethylene diamine, dimethyl hydrazine, methanol, dimethyl sulfoxide, and glycols, ethanolamines and the like in proportions such that sufficient hydrazine is present to effect dissolution of the cellulose.

Other additives known to enhance the solubility of cellulose and to be stable in the hydrazine solutions hereof can be incorporated in the cellulose solutions. Thus, quaternary ammonium hydroxides, e.g., the dibenzyldimethylammonium hydroxide referred to hereinabove, or similar basic solvents may be so utilized in the solvent system.

The presence of low boiling diluents is particularly desirable in the preparation of solutions from which it is desired to prepare cellulose fibers and foams by flashing. The addition of a diluent having a latent heat of vaporization substantially lower than that of hydrazine is necessary to permit flashing of all, or substantially all, of the hydrazine at elevated temperatures. For example, it has been found that cellulose foams can be produced by flashing hydrazine/ethylene diamine or hydrazine/ammonia cellulose solutions. Foams thus formed are useful in a variety of applications. For example, they can be used as packing materials or absorbents.

The following examples further illustrate preferred embodiments of the processes, compositions and products of the present invention. In these examples, as well as in the preceding description, unless otherwise indicated all parts and percentages are given by weight and all temperatures are in degrees Celsius.

EXAMPLES 1-4

Dissolution of Cellulose in Hydrazine

In the following examples cellulose was dissolved in hydrazine under elevated temperature and pressure conditions within high pressure Fischer and Porter aerosol tubes (Carius combustion tubes). The aerosol reaction tubes were immersed in a stainless steel beaker of approximately nine quart capacity filled with peanut oil to serve as a heating bath. Each reaction tube was connected at the top through suitable high precision Cajon adapters to a pressure gauge, a needle valve and a safety relief valve. (Temperatures within the reactor tubes were determined based on the pressures developed.) The reaction tube-valving system was raised or lowered into the oil-bath at will with the aid of a remote controlled reversible synchronous motor. A Fischer-Scientific Safety Shield was placed in front of the apparatus. The oil bath was maintained at ±1° C of the predetermined temperature settings by connecting an electronic relay to a mercury contact thermoregulator (0°–300° C) and the immersion heater.

In each of the following examples cotton linter flock (97–98% alpha cellulose, DP=2100) was the cellulose employed.

TABLE I

| | | DISSOLUTION OF COTTON LINTER FLOCK IN HYDRAZINE | | |
|---|---|---|---|---|
| Example | Concentration of Cellulose in Hydrazine (wt.%) | Bath Temperature (° C) | Ultimate Pressure Developed, Time & Temperature (° C) | Comments |
| 1 | 1 | 225° | 40 psi (about 170°) | After 5 minutes heating cellulose dispersed completely and after 15 minutes heating (40–50 psi) complete dissolution occurred, giving a transparent solution. |
| 2 | 2 | 225° | 80 psi (about 180°) | Complete dispersion at 10 psi and complete solution at 80 psi; no precipitation upon cooling to room temperatures and atmospheric pressure. After 20 hours standing the solution, which had been a transparent gel, became cloudy and turned solid in another 3–4 days. |
| 3* | 10 | 250° | 100 psi | Under these conditions the cellulose completely dissolved. |
| 4 | 4 | 250° | 100 psi (about 190°) | Under these conditions the cellulose completely dissolved. The solution was poured, with agitation, into water. Globules of liquid thus formed turned opaque gradually (after about one-half hour). |

*In this example a 70/30% (v/v) hydrazine/ethylene diamine mixture was utilized as the solvent for the cellulose.

The species dissolved in Example 4 was characterized as cellulose as follows. First, the opaque globules of the precipitated cellulose were washed repeatedly with water and dried under vacuo for 22 hours at 40° C to remove the hydrazine. Fourier-Transform infrared spectra were obtained for the raw and treated cellulose using KBr pellets. The crystallinity indices calculated by the method of Nelson, O'Connor [J. Applied Poly. Sci., 8, 1325 (1964)] were 0.95 for the raw sample and 1.0 for the treated material. X-ray diffractograms on pressed pellets gave a crystallinity of 89% for the raw material and 75% for the treated sample. These were determined by the method of Segal et al [J. Applied Poly. Sci., 8, 1325 (1964)]. The raw material had an X-ray pattern corresponding to the structure of cellulose I while that of the treated sample corresponded to the structure of cellulose II.

CONTROL EXPERIMENTS A–N

Attempted Dissolution of Cellulose in Other Solvents

In the following further experiments it was attempted to dissolve samples of the same cotton linter flock used in Examples 1–4 in a variety of other solvents, employing the same experimental system and conditions as utilized hereinabove; the results thus obtained are recorded in Table II:

EXAMPLE 5

Dissolution of Cotton Linter Flock, 1% in Hydrazine Solution

In this example 0.25 g of the same cotton linter flock utilized in the previous examples were cut into small pieces and immersed in 25 ml anhydrous hydrazine within the reaction tube. The tube was placed in the oil bath at about room temperature, and the bath was then heated.

The hydrazine initially swelled the cellulose about 4–5 times its original volume. After 5 minutes at 55° C, the cellulose began to disintegrate. By 139° C the cellulose had completely disintegrated. At 186° C (20 psi) the mixture began to thicken. At 195° C (29 psi) the mixture began to clear. At 200° C (34 psi) the mixture was quite viscous and almost clear. At 203° C, the mixture was completely clear and quite viscous.

The tube was cooled to room temperature by remov-

TABLE II

ATTEMPTED DISSOLUTION OF COTTON LINTER FLOCK IN MISCELLANEOUS SOLVENTS

| Control | Solvent and Concentration of Sample Therein (wt. %) | Bath Temperature (° C) | Ultimate Pressure Developed, Time & Temperature (° C) | Comments |
|---|---|---|---|---|
| A | hydrazine hydrate, 1% | 225° | 120 psi; 2 hrs. (about 180°) | Highly swollen; no discoloration; no sharp increase in swelling at any stage. |
| B | 50/50 (v/v) hydrazine/ ethylene diamine, 10% | 250° | 100 psi (about 220°) | No dissolution of cellulose; considerable swelling observed. |
| C | 1,1-dimethyl hydrazine, 1% | 250° | 180 psi; 1 hr. | Considerable swelling of cellulose but no dispersion or solution observed. |
| D | ethylene diamine 1% | 225° | 70 psi; 1 hr. | Swelled 5–6 fold but no dispersion occurred. |
| E | ethylene diamine/H$_2$O, 1% | 225° | 120 psi; 1 hr. | Swelled about 4 fold; no dispersion. |
| F | formamide, 1% | 250° | 15 psi; ½ hr. | No swelling. |
| G | morpholine, 1% | 250° | 90 psi; ½ hr. | No swelling. |
| H | ethylene glycol, 1% | 250° | 15 psi; ½ hr. | No swelling. |
| I | 6% SO$_2$ in water (H$_2$SO$_3$ solution), 1% | 225° | 150 psi; 1 hr. (about 180°) | No swelling or dispersion* |
| J | 70/30 DMSO/ water, 1% | 220° | 60 psi; 2 hours | No swelling or solubility |
| K | water, 1% | 280° | 220 psi; 2 hrs. (about 200°) | No swelling or solubility; pulp turned grey. Upon cooling the supernatant liquid, no trace of precipitation was observed; the cellulose pulp retained its strength when manually tested. |
| L | 90/10 water/ methanol, 1% | 220° | 100 psi; 2 hrs. (about 170°) | No swelling or solubility |
| M | 80/20 water/ methanol, 1% | 220° | 110 psi; 2 hrs. | No swelling or solubility. |
| N | 70/30 water/ methanol, 1% | 220° | 120 psi; 2 hrs. | No swelling or solubility. |

*Cf., Junio Hata and Kingo Yokota Sen-1 Gakkaishi, 24(9), pp. 415–424 (1968); U.S. Patent No. 3,424,702.

EXAMPLES 5–9

Dissolution of Cellulose in Hydrazine at Varying Concentrations and Preparation of Films and Fibers Therefrom In the following examples various weights of cellulose were dissolved in hydrazine, utilizing the aerosol reaction tubes as described above in connection with Examples 1–4 to provide solutions with various concentrations of cellulose. To assist in stirring the high viscosity mixtures a large Teflon-coated magnetic stirrer was immersed in each reaction tube, a hand-held magnet being moved outside of the tube to motivate the magnet.

ing it from the bath, and allowing it to cool in air. When the pressure dropped to atmospheric, the solution remained clear. The solution in the unopened tube was still clear the next day.

EXAMPLE 6

Dissolution of Cotton Linter Flock, 5% in Hydrazine Solution, and Preparation of Films and Fibers Therefrom In this example 3.5 g of the aforesaid cotton linter pulp and 70 ml hydrazine were charged to the reaction tube. A larger magnetic stirrer was placed in the tube than utilized in Example 5 in order to obtain greater agitation of the higher viscosity solution produced.

The tube was immersed in the oil bath at 180° C and removed frequently for stirring. At 20 psi the solution started to thicken. With good stirring, at 190° C all of the cellulose, except for a small amount on the bottom, had dissolved. The tube was then heated for 20 minutes at 195° C. The small amount of insoluble material remained adhered to the bottom and sides of the reaction tube.

After cooling, the solution was free from bubbles. At 50° F it was poured onto clean glass plates, and spread with a Gardner knife to form wet films having thicknesses of 20, 35 and 60 mils. The hydrazine can be removed by evaporation to provide cellulose films useful for wrappings.

A portion of the solution was wet-spun into fiber by pouring the same into a plastic disposable syringe and injecting it into a 10% acetic acid solution through a No. 19 needle. The extrudate was 1.5 mm in diameter. The needle was removed, and the solution extruded through the opening, giving a 3 to 4 mm thick extrudate. When this was stretched slowly, it necked down to a fiber and whitened. When this was pulled slowly (1 cm/sec), a continuous fiber was spun from the tip of the extrudate. Several lengths of fiber were left in the acetic acid solution overnight, and then air-dried.

Flat plate X-ray photographs were taken of the cellulose fibers and films produced as described in Example 6. The fiber showed slight orientation and five reflections could be seen. The air-dried film showed five reflections and appeared to be highly crystalline since there was little amorphous scattering. The Bragg spacings for the fiber and film are listed in Table III.

TABLE III

Bragg Spacings of Cellulose Fiber and Film of Example 6

| Fiber | Film | Cellulose II* | Cellulose II** |
|-------|------|---------------|----------------|
| d(A)  | d(A) | d(A)          | d(A)           |
| 7.27  | 7.35 | 7.26          | 7.18           |
| 4.45  | 4.33 | 4.48          | 4.44           |
|       |      |               | 4.35           |
| 4.14  |      | 4.10          | 4.05           |
| 3.16  | 3.08 |               | 3.13           |
| 2.48  | 2.53 |               | 2.55           |
|       | 2.18 |               | 2.21, 2.23, 2.12 |

*J. Appl. Polymer Sci., 8, 1325 (1964).
**Strongest reflections of annealed fibers of rayon (Cellulose II). Private communication, Dr. J. Blackwell, Case Western Reserve University, to be published.

The infrared absorption spectrum of a ½ mil cast film prepared as described in Example 6 was determined. The crystallinity index ratio proposed by Nelson and O'Connor [J. Appl. Polymer Sci., 8, 1325 (1964)], the ratio of absorption at 1372 $cm^{-1}$ to absorption at 2900 $cm^{-1}$, was used to estimate the crystallinity of the cast film. The ratio was 0.75. A known cellulose possessing maximum crystallinity may be obtained, for example, by hydrolyzing Fortisan, a highly crystalline Cellulose II, to remove the amorphous regions thereof and produce Fortisan hydrocellulose. Such a hydrocellulose has a ratio of 0.75 to 0.76; this corresponds to an 85% crystallinity by X-ray techniques. The highest crystallinity index ratio found for unhydrolyzed Cellulose II is 0.68 for a Fortisan rayon, which corresponds to 80% X-ray crystallinity.

EXAMPLE 7

Dissolution of Cotton Linter Flock, 7% in Hydrazine Solution and Preparation of Films and Fibers Therefrom 5.0 g of a cotton linter flock material (CL-100, obtained from International Filler, a material constituted of 97% alpha cellulose and having a DP equal to 2,100) was charged with 70 ml hydrazine to a reaction tube. The tube was immersed in the oil bath at 150° C. The solution thickened as the temperature rose.

Stirring was done frequently with the hand-held magnet. At 195° C the mixture started clearing (70 psi). After several minutes heating at 200° C the mixture cleared completely.

Films and fibers can be formed from the cellulose solution thus produced.

EXAMPLE 8

Dissolution of Cotton Linter Flock, 7% in Hydrazine Solution and Preparation of Films and Fibers Therefrom 5.0 g of the cotton linter flock was mixed with 70 ml hydrazine in the reaction tube. The oil bath was preheated to 180° C and the tube immersed therein. Violent refluxing occurred. The tube was periodically immersed and then removed from the bath until the pressure reached 10 psi. At 20 psi the reaction tube was removed and the solution mixed with the magnetic stirrer. The bottom of the cellulose mixture was quite viscous and could not be manually mixed.

The heating and mixing procedure was repeated until the tube reached a pressure of 50 psi, at which point the magnetic stirrer was no longer operable. Heating was thereafter continued to 195° C. After cooling, an attempt was made to manually break up the mass of cellulose at the bottom of the reaction tube with a metal rod. It was so tough and rubbery that this was not feasible.

Films and fibers were produced by re-heating the cellulose mass, and thereafter casting and extruding the same from the resulting solution.

EXAMPLE 9

Dissolution of Cotton Linter Flock, 10% in Hydrazine Solution and Preparation of Films and Fibers Therefrom 7 g of the cotton linter flock and 70 ml hydrazine were charged to a reaction tube. The tube was heated with stirring. Gel formation occurred on the sides of the tube. The tube was repeatedly immersed in the oil bath, removed, and the tube sides scraped with the magnetic stirrer. After two hours of repeated immersion and stirring, gel formation precluded complete solution formation.

By the time bubbling of the solution terminated, it was too viscous to permit escape of the bubbles formed. Voids were therefore formed in the films cast from the partial solution. Fibers were also drawn from the cellulose mixture.

It may be seen from Examples 5-9 that the viscosity of the solution is dependent on the concentration of the cellulose solution. Employing efficient stirrers and lower D.P. celluloses, solutions having cellulose concentrations greater than 10% can be prepared.

Most of the cellulose in hydrazine solutions produced in Examples 6–9 remained clear at room temperature for as long as 4 or 5 days. Some samples began to cloud after only one day. It is apparent that the cellulose remained in solution for a sufficient period to permit subsequent processing for the formation of films, fibers, foams or fabricated articles therefrom.

EXAMPLE 10

Preparation of Cellulose Foam from Solutions of Cotton Linter Flock in Hydrazine/Ethylene Diamine A cellulose foam can be prepared in the following manner: A cellulose solution in a 70/30% (v/v) hydrazine/ethylene diamine mixture was formed as in Example 3. Upon release of the pressure in the reaction tube from 100 psi to atmospheric pressure some of the solvent flashed off, leaving a viscous, foamy product at the base of the collecton flask. The product solidified after 20 hours and was washed with water. Examination under microscope revealed a foamed structure.

EXAMPLE 11

Dissolution of Low Molecular Weight Dissolving Pulp in Hydrazine

A low molecular weight cellulose dissolving pulp (Rayonier Corp., R550) having a D.P. of 550 was dissolved in anhydrous hydrazine (96–97% purity) employing the procedure and equipment described in Example 1. At 0.1% concentration cellulose, a solution formed at 180° C after mixing for 55 minutes. At 33% concentration the cellulose was dissolved after mixing for 450 minutes at temperatures reaching 201° C.

Useful films and fibers can be formed from these solutions in the manner described above.

EXAMPLE 12

Dissolution of High Molecular Weight Dissolving Pulp in Hydrazine

When in Example 11, a higher molecular weight cellulose dissolving pulp, having a D.P. of 1650, is employed (Rayonier Corp., R 1650), the same or similar results are obtained in that the cellulose material dissolves in hydrazine, and useful films and fibers can be formed therefrom.

EXAMPLE 13

Separation of Cellulose from Lignocellulosic Materials

Oak shavings were dispersed in anhydrous hydrazine under ambient conditions (about 20° C) and heated under pressure until solution occurred (190° C). The solution was cooled, a gel mass forming therein. Water was added to the residual solution, a colored precipitate forming. On standing, the precipitate whitened, the colored impurity settling out. The white precipitate was cellulose.

EXAMPLE 14

Dissolution of Cellulose in Hydrazine/Diluent Mixtures

A 1% solution of cotton linter flock in hydrazine was prepared in the manner described in Example 1. Appropriate amounts by volume of various diluents were mixed with hydrazine in 20 ml vials to give 10 ml of each mixture. Approximately 0.2 ml of the 1% cellulose solution in hydrazine was added to each mixture, the vial sealed and stirred at room temperature. Solubility of the cellulose was judged by the absence or appearance of a cellulose precipitate. To test for the possibility of a gel dispersion, excess diluent was added. The generation of a dispersed, fibrous precipitate confirmed the original solubility. The data are summarized in the following tabulation:

TABLE IV
SOLUBILITY OF CELLULOSE IN HYDRAZINE/DILUENT MIXTURE

| Diluent | Hydrazine/Diluent Ratio by Volume | Behavior |
| --- | --- | --- |
| Methanol | 75/25 | Soluble |
| Methanol | 50/50 | Precipitated |
| 1,1-Dimethyl hydrazine | 75/25 | Soluble |
| 1,1-Dimethyl hydrazine | 50/50 | Precipitated |
| Dimethyl Sulfoxide | 75/25 | Soluble |
| Dimethyl Sulfoxide | 50/50 | Soluble |
| Dimethyl Sulfoxide | 40/60 | Soluble |
| Dimethyl Sulfoxide | 30/70 | Precipitates after five minutes |
| Dimethyl Sulfoxide | 20/80 | Insoluble |
| N-methyl pyrrolidone | 70/30 | Soluble |
| N-methyl pyrrolidone | 50/50 | Insoluble |
| $NH_3$, anhydrous[2] | 14/25 | Soluble |
| $NH_3$, anhydrous[2] | 14/30 | Precipitated |

[1]A 5% solution was used which did not disperse. The edges of the viscous mass turned white.
[2]Cellulose was initially dissolved in the hydrazine in 0.3% concentration. $NH_3$ was added in a closed system, under pressure at room temperature.

It will be understood that various changes may be made in the parameters of the processes, compositions and products described hereinabove without departing from the scope of the present invention. Accordingly, it is intended that the invention is not limited by the preceding description of preferred forms thereof, but only by the following claims.

What is claimed is:

1. A solution of cellulose in hydrazine where in the solvent medium comprises at least 30% by weight hydrazine.
2. The solution of claim 1, in which the solvent medium comprises at least 50% hydrazine.
3. The solution of claim 1, in which the solvent medium comprises at least 70% hydrazine.
4. The solution of claim 1 containing a diluent.
5. The solution of claim 4, wherein the diluent is water.
6. A process for the preparation of a cellulose product, which comprises dissolving cellulose in a solvent medium having at least 30% by weight hydrazine, and preparing the cellulose product from the resulting solution.
7. The process of claim 6, wherein the solvent medium in which the cellulose is dissolved comprises at least 50% by weight hydrazine.
8. The process of claim 6 wherein the solvent medium in which the cellulose is dissolved comprises at least 70% by weight hydrazine.
9. The process of claim 6, wherein the cellulose is dissolved at temperatures of from 100° to 250° C.
10. The process of claim 6, in which the cellulose dissolved has a degree of polymerization of from 50 to 2,500.
11. The process of claim 6, wherein the hydrazine solvent is admixed with a diluent.
12. The process of claim 11, wherein the diluent is water.
13. The process of claim 6, in which the solution is spun into a cellulose fiber.

14. The process of claim 6, in which the solution is extruded into a cellulose film.

15. The process of claim 6, in which the solution is formed into a cellulose foam.

16. A process for the separation of cellulose from admixture with lignocellulosic materials, which comprises dispersing the mixture in a solvent medium having at least 30% by weight hydrazine and separating the cellulose therefrom.

17. The process of claim 16, wherein the solvent medium in which the mixture is dispersed comprises at least 50% by weight hydrazine.

18. The process of claim 16, wherein the solvent medium in which the cellulose is dispersed comprises at least 70% by weight hydrazine.

* * * * *